Sept. 1, 1964 C. B. DUNN 3,146,966
FISHING REEL WITH FRICTION DRIVE
Filed May 23, 1960 3 Sheets-Sheet 1

INVENTOR
Charles B. Dunn

BY Wilkinson, Mawhinney & Theibault
ATTORNEYS

Sept. 1, 1964
C. B. DUNN
3,146,966
FISHING REEL WITH FRICTION DRIVE
Filed May 23, 1960
3 Sheets-Sheet 2
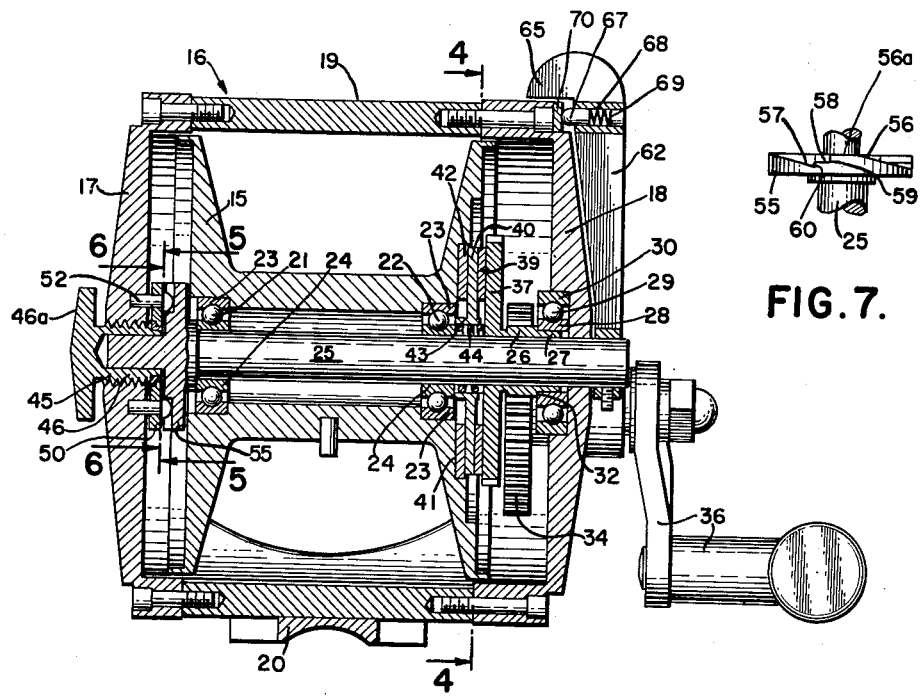
FIG. 3.
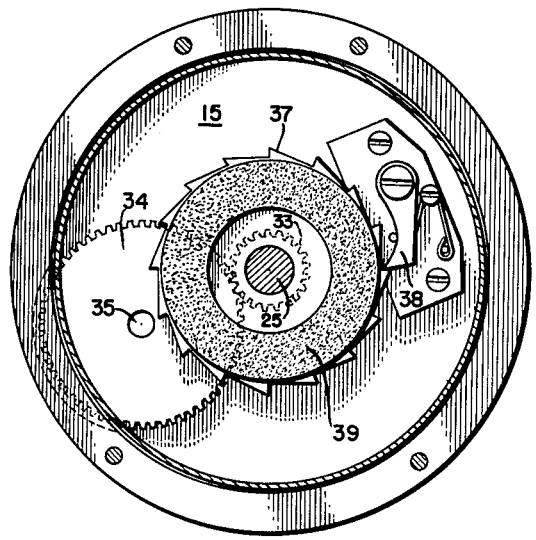
FIG. 4.
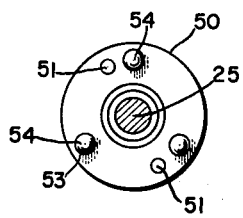
FIG. 5.
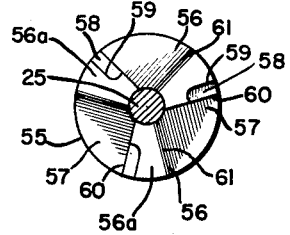
FIG. 6.
FIG. 7.
INVENTOR.
Charles B. Dunn
BY Wilkinson, Mawhinney & Theibault
ATTORNEYS Sept. 1, 1964  C. B. DUNN  3,146,966
FISHING REEL WITH FRICTION DRIVE
Filed May 23, 1960  3 Sheets-Sheet 3

INVENTOR
Charles B. Dunn

BY
Wilkinson, Mawhinney, & Theibault
ATTORNEYS

United States Patent Office

3,146,966
Patented Sept. 1, 1964

3,146,966
FISHING REEL WITH FRICTION DRIVE
Charles B. Dunn, Miami, Fla., assignor to Anglers Manufacturing Company, Miami, Fla., a corporation of Florida
Filed May 23, 1960, Ser. No. 30,789
2 Claims. (Cl. 242—84.45)

The present invention relates to a fishing reel with friction drive, and has for an object to provide a novel construction of drag or clutch mechanism.

The invention has for another object to provide a novel form of disc drag assembly and a novel form of brake applying and releasing device with a pre-set arrangement enabling such device to control the application of the drag or clutch mechanism for free spool, anti-backlash and full clutch binding the spool to the drive mechanism.

The invention further serves to provide external controls for the drag assembly and the pre-set cam and pressure plate association by which convenient pre-setting and operation may be conveniently carried out in practice.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a longitudinal central sectional view taken on the line 3—3 in FIGURE 2.

FIGURE 4 is a transverse sectional view taken on the line 4—4 in FIGURE 3.

FIGURE 5 is a face or plan view of a form of pressure member or plate.

FIGURE 6 is a similar view of a complemental cam member or plate.

FIGURE 7 is an edge view of such cam member with parts of the spindle broken away.

Figure 1:
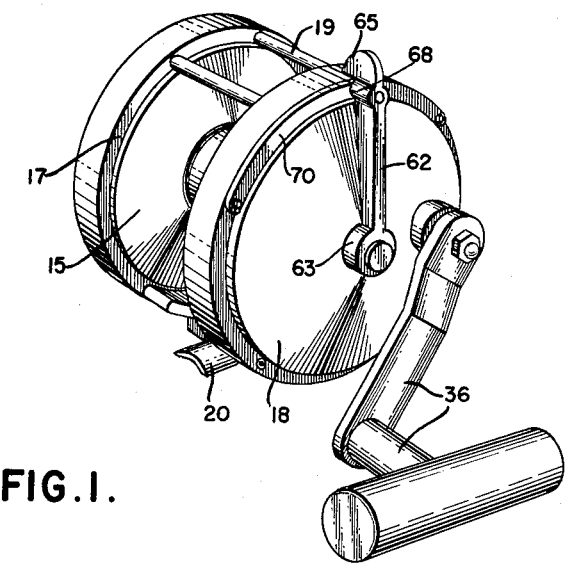
FIGURE 1 is an isometric view of a fishing reel constructed in accordance with the present invention.

Referring more particularly to the drawings, 15 designates a spool and 16 generally a support comprising rear and front end heads or housings 17 and 18 and a transverse cage made up of circularly spaced bars 19 or other form of spool cage or frame.

This cage or frame has a reel base 20 for attachment to the reel seat of a fishing rod.

The spool is mounted upon ball bearings 21 and 22 having outer race rings 23 affixed to the spool 15 and inner race rings 24 affixed to a spindle 25 which is endwise movable together with the spool 15 and rotatable independently of the rotary movement of the spool 15.

Independently rotatable about the spindle 25 is a hub 26 of a driving mechanism having an outer hollow bearing 27 extending within an inner race ring 28 of an annular ball bearing 29 which also includes an outer race ring 30 affixed to the end head 18 of the frame. An outstanding shoulder 32 on the hub abuts against the inner end 28 of the inner race ring 28 to avoid outward endwise movement of the hub 26 and the pinion 33 formed on or carried by the hub 26 which meshes with a drive gear wheel 34 on a drive shaft 35 driven by hand crank 36.

As shown to best advantage in FIGURE 4, the hub also fixedly carries a disc 37 which functions as a drive or brake or drag member or disc, the same having at its outer edge ratchet teeth engaged by a spring-pressed pawl 38 carried within the head 18.

Affixed to the inner face of the drive-brake disc 37 is a friction drag or brake facing or lining 39 disposed opposite an intermediate brake or drag member 40. The adjacent end of the spool 15 affords also a spool brake or drag member 41 to which is affixed a friction drag or brake facing or lining 42 adapted to engage the opposite side of the intermediate brake or drag member 40.

This intermediate member 40 has a hub 43 of an internal diameter sufficiently greater than the external diameter of the spindle 25 over which it is fitted to accommodate a helical spring 44 bearing at one end against the inner end of the drive-brake disc 37 and at its other end against the outer end of the adjacent inner race ring 24.

At the frame end head 18 the spindle 25 is supported in part by the hub 26 and at its bearing member 27 and by the wall of an opening in the end head 18 through which this end of the spindle 26 projects.

The other end of the spindle is accommodated within an internal bearing 45 of a tubular adjusting member 46 which is externally threaded to engage the similarly internally threaded opening 47 through the opposite end head 17. The end of the spindle 25 which is received in the tubular adjusting member 46 is rotatable and axially slidable therein.

The adjusting bearing member 46 is provided externally of the end head 17 with a knob 46ª for manually rotating such member 46 to feed it screw-wise axially along the internally threaded opening 47 inward or outward accordingly, as the rotation is in one direction or the other.

This member 46 is provided at its inner end with an externally smooth reduced terminal portion 48 bounded at its outer end by shoulder 49 produced by the differential external diameters of the screw-threaded portion of the member 46 and the inner reduced end 48. A pressure member or plate 50 having a central opening therethrough is fitted over the inner smooth reduced end 48 and abutted against the shoulder 49.

As shown more particularly in FIGURE 5, this pressure member or disc 50 is provided with openings 51 therethrough, here shown to be two in number, which enable the plate to slide back and forth on pins 52 projecting inwardly from the end head 17 but preventing the rotation of the pressure member 50 while the adjusting member 46 may rotate freely with reference to the pressure member 50 for the purpose of moving such pressure member 50 toward and from the cam face of a complemental cam member or plate 55, shown more particularly in FIGURES 6 to 10, inclusive.

Still referring to FIGURE 5, the pressure member 50 is supplied with part-spherical sockets in its inner face to rotatably receive rotary balls 54 which in the assembled position of the parts project inwardly from the inner face of the pressure member 50 and abut against the cam face of the cam member 55.

This cam member, as more particularly shown in FIGURES 6 and 7, has high points or surfaces 56, low points or surfaces 57 and intermediate points or surfaces 58. As shown in FIGURE 7, these surfaces are in a stepped arrangement with shoulders 59, 60 and 61 therebetween. The rotary balls 54 of the pressure member 50 are adapted to occupy the high, low and intermediate points 56, 57 and 58 of the cam member or plate 55 which is affixed to the spindle 25 and rotatable therewith into the three positions illustrated in FIGURES 8, 9 and 10.

The spindle 25 and its cam member 55 are angularly adjustable by the rotation of the spindle 25 through the medium of an external adjusting member or arm 62 having a hub 63 secured by a set screw 64 or the like to the projecting end of the spindle 25 lying outwardly of the end head 18 whereby this adjusting member 62 is located convenient to the hand crank 36 for adjustment at the same end of the reel frame.

Figure 2:
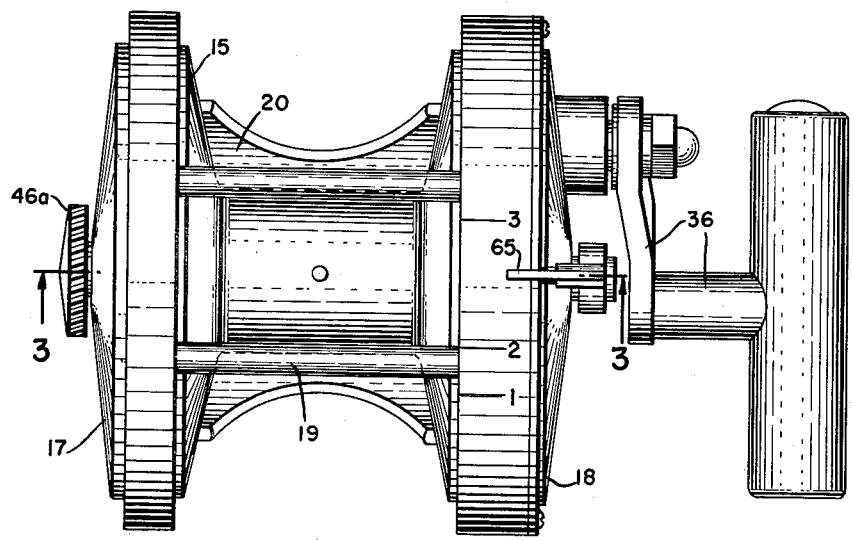
FIGURE 2 is a plan view of the same taken on an enlarged scale.
Figure 12:
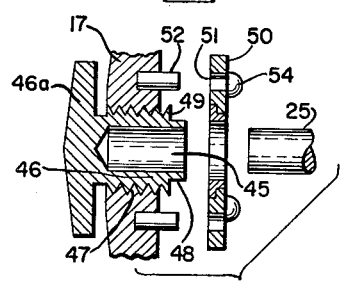
FIGURE 12 is an exploded view of the adjusting means for the pressure plate and spindle bearing.

At its outer end the adjusting member 62 is provided with an index finger 65 overlapping a scale inscribed upon the reel frame, as shown in FIGURE 2. The divisions of this scale are marked 1, 2 and 3 to indicate the three positions of the cam plate 55 with respect to the rotary balls 54 of the pressure plate 50, namely, whether the high, intermediate or low points of the face of the cam plate 55 are presented to the rotary balls 54.

As more particularly shown in FIGURE 3, the adjusting member 62 is provided with a sliding detent 67 disposed in a socket 68 made transversely through the adjusting member 62 and urged by a spring 69 disposed in the socket 68 back of the detent 67 whereby the free rounded end of the sliding detent 67 will be urged yieldably but frictionally against a wear plate 70 on the reel frame. This plate 70 is arcuate, as shown in FIGURE 1, being struck on the radius identified by the adjusting member 62 in its relation to the axis of the spindle 25. If desired, the plate 70 may be provided with notches to receive the detent 67 at the three points of the scale referred to. However, the spring 69 may be sufficiently strong to hold the detent by friction against the wear plate 70 in the position to which it is adjusted without permitting any casual angular movement of the adjusting member 62 and spindle 25.

In the use of the device, it will be noted that the spool 15 rotates on its ball bearings 21, 22 quite independently of the angular and endwise adjusting movements of the spindle 25, which spindle may also freely slide axially and rotate independently of any rotary movement of the hub 26 of the drive mechanism.

Although it will be understood that the relation of the high, intermediate and low points of the cam disc 55 may be related in any sequence to the scale positions of the index finger 65, as illustrated in FIGURE 2, it will be noted that the scale positions 1 and 2 are relatively close together compared with the considerably greater angular distance between the scale positions 2 and 3. Accordingly, when the adjusting member 62 is moved to the scale position 1, the intermediate points or surfaces 58 of the cam plate 55 will be in registry with the rotary balls 54 of the pressure plate 50. Then when the adjusting member 62 is moved angularly to scale position 2, the low points 57 of cam member 55 will be brought into registry with the rotary balls 54 of the pressure plate 50. It will be noted that there is only a small angular distance between the points 58 and 57 in FIGURE 6 and consequently as the cam plate 55 in this FIGURE 6 is rotated counterclockwise it will only require relatively small angular movement of the spindle 25 and adjusting arm 62 to bring the low points 57 into registry with the rotary balls 54.

Therefore, in FIGURE 2 scale positions 1 and 2 are rather close together. However, in FIGURE 6 it will be clear that a much greater angular movement will be required in the cam member 55 and in the spindle 25 and its adjusting member 62 before the high points or surfaces 56 of the cam plate are brought into registry with the rotary balls 54 of the pressure plate 50, and hence the considerably greater distance shown in FIGURE 2 between the scale positions 2 and 3.

It will be clear from FIGURES 6 and 7 that the high points 56 are adjacent flat extension high points 56ª which may be brought into registry with the rotary balls 54 when the adjusting arm or member 62 is brought to the final scale position 3.

As the confronting faces of the non-rotary pressure plate 50 and rotary cam plate 55 are obscured from the view of the operator by frame parts, the operator, in moving the adjusting member 62, may obtain the "feel" of the high, intermediate and low positions by the resistance of the rotary balls 54 to the shoulders 59, 60 and 61. It will also be understood that there will be a certain sound signal as these balls click up and down the shoulders.

Figure 8:
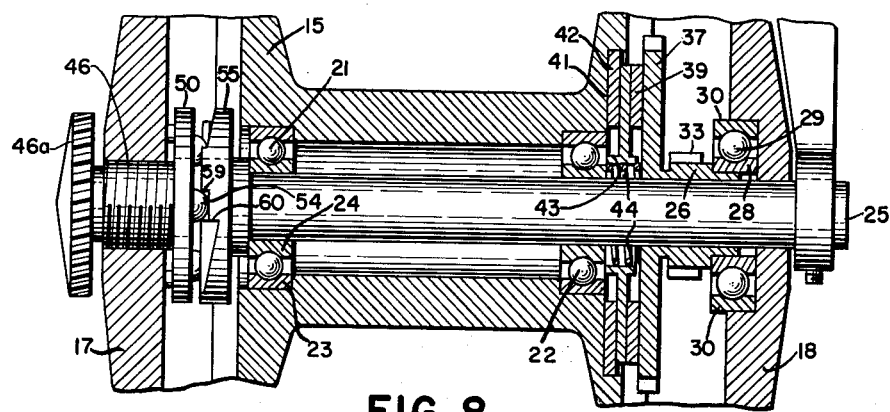
FIGURES 8, 9 and 10 are longitudinal sectional views taken on an enlarged scale showing three positions of the pre-set device and drag or brake assembly.

FIGURE 8 shows scale position 1 in which the rotary balls 54 occupy the intermediate points 58 of the cam plate 55. In this position the spindle 25 has been shifted endwise to a slight extent sufficient to move the spool 15 endwise to create dragging friction between the brake parts. This is an anti-backlash position useful in casting to prevent backlash conditions in the line.

Figure 9:
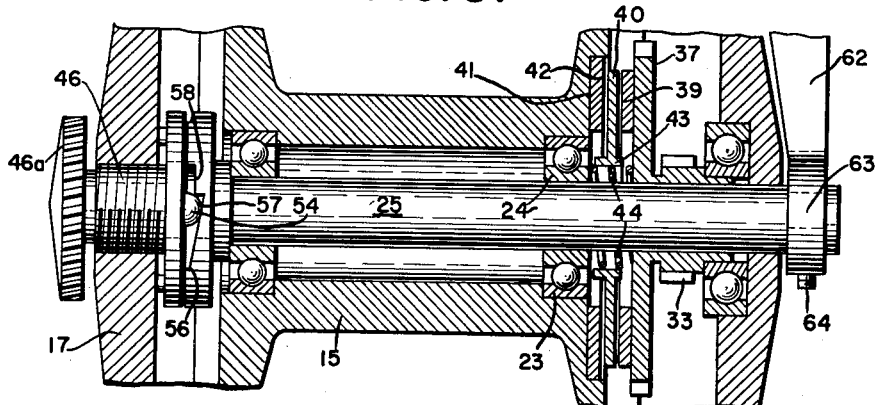

FIGURE 9 shows scale position 2 an which the rotary balls 54 occupy the low points 57 of the cam plate 55. This relieves to the greatest extent any endwise pressure on the spool 15 and the brake members and consequently the spring 44 in FIGURE 9 is shown as having separated such brake members. This position is known as free spool.

Figure 10:
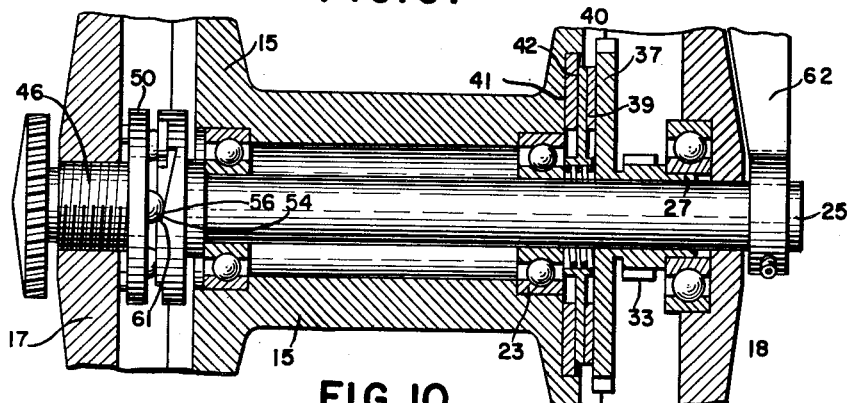
Figure 11:
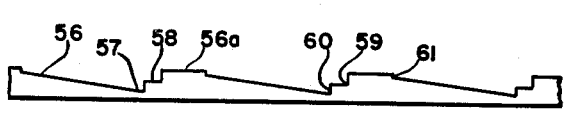
FIGURE 11 is a diagrammatic view of the cam pattern.

FIGURE 10 illustrates scale position 3 in which the high points 56 of the cam plate 55 have ridden up on the balls and consequently shifted to the greatest extent the spool 15 against the brake members and closed the same into driving tight position, whereby rotation of the hand crank 36 through the drive gear mechanism and through the brake members will cause the spool to rotate to reel in the line.

By adjusting the tubular adjusting member 46, the pressure plate 50 may be moved axially toward or from the cam plate 55, thus adjusting for tight or loose braking or drag pressure and compensating for any irregularities in the construction of the cam member and other connected parts.

It will be appreciated that by having the pressure and cam plates 50, 55 located at one end of the reel frame, the same will not encroach upon the driving mechanism carried by the hub 26 at the opposite end of the frame, and the arrangement also permits adjustment of the pressure plate 50 through a knob 46ª exposed through one head of the drum while the operating adjusting member 62 for rotating the spindle and cam plate 55 is located externally of the other frame end plate whereby both this adjusting member 62 and the hand crank 36 are accessible to the same hand of the operator.

Although I have disclosed herein the best form of the invention known to me at this time, I reserve the right to all such modifications and changes as may come within the scope of the following claims.

What is claimed is:
1. A fishing reel comprising
   (a) a frame including
   (b) front and rear housings,
   (c) a rock spindle mounted for axial movement in the frame,
   (d) a spool journaled to rotate independently about the spindle and entrained to move axially with the spindle,
   (e) a drive mechanism for said spool located between the front housing and the adjacent end of the spool for free rotation around the spindle and including disengageable clutch elements connected to said spindle and spool,
   (f) yieldable means for urging the spindle and spool axially in a direction to open the clutch element,
   (g) a cam member affixed to rock and axially move with the spindle,
   (h) a pressure member having high points engaging the cam member,
   (i) the cam and pressure members contained between the rear housing and the rear end of the spool,
   (j) an operating member affixed to the spindle forwardly of the front housing for rocking the spindle and cam member relatively to the pressure member to cause axial shifting of the spindle and spool in a direction to close the clutch elements in opposition to the action of the yieldable means,
   (k) an adjusting member threaded through the rear housing having means at its forward end portion for receiving and carrying the pressure member for moving the pressure member toward and from the companion cam member, (*l*) said adjusting member exposed exteriorly of the rear housing for manual adjustment, (*m*) said pressure member being perforated, and (*n*) pins projecting forwardly from the rear housing for slidably receiving the perforated portions of the pressure member.

2. A fishing reel comprising (*a*) a frame including (*b*) front and rear housings, (*c*) a rock spindle mounted for axial movement in the frame, (*d*) a spool journaled to rotate independently about the spindle and entrained to move axially with the spindle, (*e*) a drive mechanism for said spool located between the front housing and the adjacent end of the spool for free rotation around the spindle and including disengageable clutch elements connected to said spindle and spool, (*f*) yieldable means for urging the spindle and spool axially in a direction to open the clutch elements, (*g*) a cam member affixed to rock and axially move with the spindle, (*h*) a pressure member having high points engaging the cam member, (*i*) the cam and pressure members contained between the rear housing and the rear end of the spool, (*j*) an operating member affixed to the spindle forwardly of the front housing for rocking the spindle and cam member relatively to the pressure member to cause axial shifting of the spindle and spool in a direction to close the clutch elements in opposition to the action of the yieldable means, (*k*) an adjusting member threaded through the rear housing having means at its forward end portion for receiving and carrying the pressure member for moving the pressure member toward and from the companion cam member, (*l*) said adjusting member exposed exteriorly of the rear housing for manual adjustment, (*m*) said adjusting member having a bore for receiving the adjacent end of the spindle as a bearing.

References Cited in the file of this patent

UNITED STATES PATENTS

| | | |
|---|---|---|
| 1,547,238 | Russell et al. | July 28, 1925 |
| 1,551,072 | Stine | Aug. 25, 1925 |
| 1,941,739 | Crawford | Jan. 2, 1934 |
| 2,209,598 | Coxe | July 30, 1940 |
| 2,278,022 | Rodgers | Mar. 31, 1942 |
| 2,282,995 | Dumond | May 12, 1942 |
| 2,298,481 | Hayes | Oct. 13, 1942 |
| 2,329,381 | Bannister | Sept. 14, 1943 |
| 2,332,862 | LeTourneau | Oct. 26, 1943 |
| 2,417,732 | Bland et al. | Mar. 18, 1947 |
| 2,462,365 | Crawford | Feb. 22, 1949 |
| 2,531,610 | Butzman | Nov. 28, 1950 |
| 2,540,338 | King | Feb. 6, 1951 |
| 2,852,116 | Spase | Sept. 16, 1958 |
| 2,896,874 | Nurmse | July 28, 1959 |
| 2,931,476 | Zeidler et al. | Apr. 5, 1960 |
| 3,017,135 | Wood | Jan. 16, 1962 |